April 23, 1935.    M. B. CHAMBERS    1,998,491
ELECTROMAGNETIC BRAKE
Filed March 5, 1932
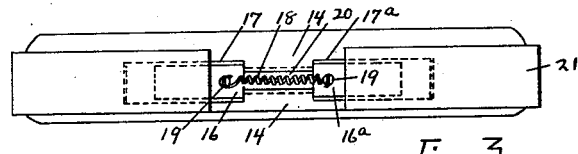
Fig. 3
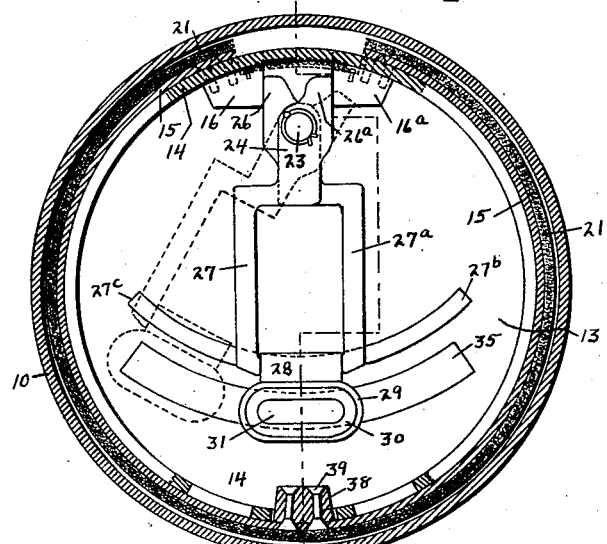
Fig. 1
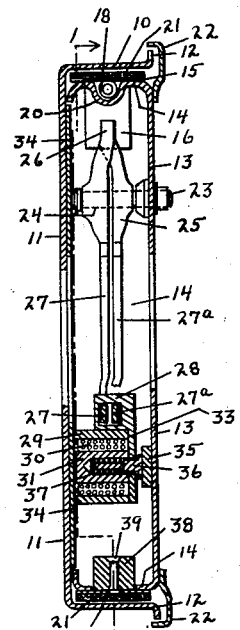
Fig. 2
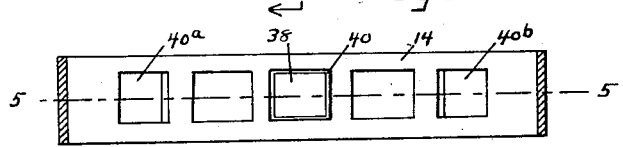
Fig. 4
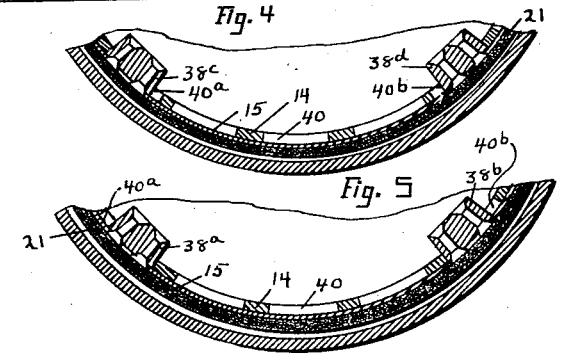
Fig. 5
Fig. 6
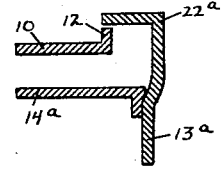
Fig. 7
INVENTOR.
Morris Burr Chambers
BY
Samuel E. Foule
ATTORNEYS.

Patented Apr. 23, 1935

1,998,491

UNITED STATES PATENT OFFICE 1,998,491

ELECTROMAGNETIC BRAKE

Morris Burr Chambers, Huntington Park, Calif., assignor to Chambers Electric Brake Corporation, Seattle, Wash., a corporation of Washington Application March 5, 1932, Serial No. 596,957

18 Claims. (Cl. 188—140)

This invention relates to electro-magnetic brakes, and particularly to brakes for automotive vehicles, its object being the production of a brake which is simple and economical in construction, reliable in action, easily controlled, and which is adaptable for use on vehicles of substantially all types and sizes without material change in the design of the vehicle.

In brakes which are operated solely by manual power, a considerable force must necessarily be applied to set the brake in the first instance, and that force must be maintained while the brake is in action. Hydraulic or other fluid-pressure brakes require a pump for the fluid and means for operating the pump, all of which add to the initial cost of the vehicle, to its weight, its upkeep and its operating expenses. My brake is operated electro-magnetically by current from any suitable source, as from the battery which furnishes the ignition and lighting currents and which is a part of the necessary equipment of the vehicle. Therefore, my brake increases but little the initial cost of production of the vehicle and it adds substantially no weight. Further, the operation of the brake calls for only a negligible amount of labor in setting or maintaining it in its set position, all that is required being that expended in closing an electric switch and in maintaining the switch in closed position. Any suitable arrangement of electric circuits may be adopted, and it is deemed unnecessary specifically to illustrate the same in the drawing. Any well-known rheostat may be included in the circuit to control the current and thus regulate the brake action.

In my applications filed June 20, 1931, Serial No. 546,633 and October 5, 1931, Serial No. 566,862, I have disclosed electro-magnetic brakes in which the brake-band is given substantially a full wrap within the drum. While brakes constructed in accordance with these disclosures are satisfactory in the hands of careful and competent operators, they are too sensitive and too vigorous in action for the average driver to control. The extent to which the brake-band should be permitted to wrap depends upon the amount of brake resistance required and that, in turn, depends upon the vehicle to which the brake is applied. A heavy and fast moving vehicle requires a more powerful braking action than does a lighter or a more slowly moving vehicle. At the same time, it is impracticable to provide different brake structures for all of the various weights and types of vehicles, since the producer should be able to confine his product to a relatively few sizes of brakes, leaving it to the assembly man of the vehicle or the mechanic so to adjust the brake as to give the braking action required for the particular vehicle to which the brake is to be applied. It is one of the principal objects of my present invention to enable the said assembly man or mechanic so to adjust or regulate the brake as to vary the wrap of the brake-band to give the braking action required for the vehicle which he is assembling.

In the accompanying drawing I have shown what is at the present time my preferred construction, although I desire it to be understood that the invention is not limited to the details shown except as the same are specifically set forth in the accompanying claims. In said drawing, Fig. 1 is a sectional view taken through the brake on the broken line 1—1 of Fig. 2 and looking in the direction of the arrows thereon; Fig. 2 is a section through the brake on the broken line 2—2 of Fig. 1; Fig. 3 is a top plan view of the brake-band and of the underlying flange of the back plate, said view showing the spring which draws the free ends of the band together; Fig. 4 is a plan view of the lower half of the flange of the back-plate showing the apertures therein for engagement by the anchor lug or lugs on the brake-band; Figs. 5 and 6 are sectional views taken on the line 5—5 of Fig. 4 and showing different positions of the anchor lugs for securing different lengths of wrap for the brake-band, and Fig. 7 is a detail view showing a modified structure.

Taking up a detailed description of the invention by reference to the drawings, 10 designates the flange of the brake-drum 11, said flange being preferably provided with an outstanding marginal flange 12. Spaced from but coaxial with the drum 11 is the stationary back-plate 13, the same having a marginal flange 14 extending toward the brake drum and forming therewith a chamber within which are located the mechanisms for expanding the brake-band. This brake-band is indicated by the numeral 15. It is a split steel band which is provided with shoes 16 and 16a at its respective ends. These shoes project inwardly through apertures 17 and 17a respectively in the flange 14 of the back-plate, and they are drawn toward each other by a spring 18 which has its ends attached to the respective shoes, as by means of screws 19. The slots 17 and 17a are made long enough to permit limited circumferential movement of the brake-band in either direction when the brake is applied. That portion of the flange 14 of the back-plate which is between the apertures 17 and 17a is swaged downwardly at 20 to form a chamber for the spring 18, as shown in Fig. 2. The brake-band 15 is provided with a liner 21 of material suitable for frictional engagement with the inner surface of the brake-drum flange 10. As will be best seen from Fig. 2, the brake-band and its liner occupy an annular recess between the flanges 10 and 14 of the brake-drum and back-plate respectively. For preventing entrance of dirt, rain etc. into said annular recess, the back-plate is provided with an outwardly extending, annular flange or member 22, the same being turned laterally at its outer edge to overhang the flanged margin 12 of the brake-drum flange.

Projecting inwardly from the back-plate 13 adjacent the shoes 16 and 16a of the brake band is a pivot-bolt 23, the same being secured to the back-plate in any suitable manner. Pivoted upon the bolt 23 is a pair of levers 24 and 25, the same having upwardly extending cam portions 26 and 26a respectively which engage with the respective shoes 16 and 16a of the brake-band. Each of the levers has an arm 27 or 27a which extends below the pivot-bolt 23 and is thence bent laterally and extended downwardly, the extended portions of said arms being, when in their normal positions, substantially parallel and on opposite sides of the axle of the vehicle, as will be understood. Below the space occupied by the axle, not shown, the arms 27 and 27a are each turned laterally and are curved in the arc of a circle having the axis of the pivot-bolt 23 at its center. In Fig. 1, the arm 27 is turned toward the right and is extended in a curve to the point 27b, while the arm 27a is turned to the left and is extended to the point 27c. The curved portions of these arms lie in parallel planes and, where they overlap below the space for the axle, they pass through a bracket 28 which is attached to the exterior shell 29 of an electromagnet, the coil of which is indicated at 30 and the inner pole piece at 31. The conductor leading to the coil 30 is indicated at 33 in Fig. 2 and is preferably passed outwardly through an aperture in the back-plate 13, said conductor being led to any suitable source of electric power. The circuit which includes the conductor 33 also includes the necessary switch and rheostat, whereby the current within the coil may be switched on or off and regulated in strength to give the desired braking effect, as will hereinafter be more fully described.

On the inner surface of the brake-drum 11 and coaxial with the latter is an annular plate 34 of magnetic material, so positioned with respect to the electro-magnet as to form the magnet armature, the lines of magnetic force passing from the core 31 to the shell 29, or vice versa, through said plate. The armature-plate is secured to the brake-drum and turns with the latter so that, when the magnet is energized, it is attracted to the armature-plate; and, if the latter be moving rotatively, the magnet will be moved from its normal position shown in full lines in Fig. 1 either to the right or left, depending upon the direction of rotation of the brake-drum and plate. If it be assumed that the brake-drum flange 10 of Fig. 1 is turning anti-clockwise and the magnet is energized, the magnet will be carried to the right in said figure. The bracket 28 is preferably long enough to extend the full distance between the parallel vertical portions of the arms 27 and 27a so that, as the magnet is moved to the right, the bracket at once engages with the arm 27a and pushes it to the right. At the same time, the bracket slides upon the curved part of the arm 27 toward the end marked 27b thereof. However, said arm 27 does not then move, since it is in engagement with the hub of the wheel, not shown, or with some other suitably positioned stop device. Conversely, if the magnet be energized while the brake-drum is turning clock-wise, as viewed in Fig. 1, the magnet with its bracket 28 is swung to the left, thus pushing the arm 27 in that direction to a position such as is indicated in dotted lines. At the same time, the bracket slides upon the curved portion of the arm 27a, which is then maintained stationary. It will be seen, therefore, that the curved portions of the said arms support the magnet through its bracket 28. Since the levers 24 and 25 are pivoted on the bolt 23, eccentric as respects the axle, and since the armature-plate 34 rotates about the axle as a center, it follows that the magnet and the plate move in arcs having different centers and that the magnet is forced, as it moves circumferentially, to travel outwardly across the surface of the armature-plate. Since the bracket 28 is of considerable length, the passage therethrough for the curved portions of the arms 27, 27a is preferably curved in conformity with said portions, the passage fitting about said curved portions snugly but not too tightly so as to prevent unnecessary looseness and still not to interfere with the easy sliding movement of the bracket on the arms. The arms are returned to their normal positions, as shown in Fig. 1, by the spring 18 and by the natural resiliency of the brake-band. If in any case these prove insufficient for the purpose, an additional spring connecting the arms and drawing them toward each other may be employed, as will be obvious.

It is, of course, desirable to operate the brake with as little current as practicable, and it is therefore preferred to hold the magnet in light contact with the armature-plate 34, the pressure being normally sufficient merely to cause the magnet to contact said plate without creating unnecessary friction or causing appreciable wear. Being thus already in contact with the armature, a comparatively weak current will suffice to cause the magnet to swing when it is energized. For holding the magnet thus lightly in contact with the armature-plate, I mount upon the back-plate 13 a non-magnetic arc-shaped plate or strip of metal 35, the same being concentric with the bolt 23. Against this curved plate bears the head of a pin or plunger 36, the latter extending into a bore of the pole-piece 31 and the yoke of the magnet and being provided with a light coiled spring 37 which engages at its ends respectively with the wall of the said bore and with a shoulder on the pin or plunger, whereby the stress of the spring tends to force the plunger out of the bore to press the plunger head against the non-metallic plate or strip 35. This pressure is sufficient only to press the magnet lightly against the armature-plate 34.

While in Fig. 2 I have shown the flange 14 integral with the back-plate and the annular member 22 attached to the latter, this arrangement may be substantially reversed, as indicated in Fig. 7, which shows the back-plate 13a continued outwardly to include the part 22a which overlaps the marginal flange 12 of the brake-drum flange 10, while the member corresponding to the flange 14 is attached to the back-plate so as to underlie the brake-band. For reasons hereinafter explained, I prefer to have the member 14 continuous circumferentially, as in Figs. 1, 2 and 3. However, this member may consist of a series of narrow plates 14a, one of which is shown in Fig. 7, which series extends in a circle about the axial center of the back-plate 13a, being secured to the back-plate in any suitable manner, as by welding. Or, the members 14a may be merely pins or bolts secured to the back-plate and projecting inwardly beneath the brake-band.

As will be understood, if either end of the brake-band be moved until the brake liner engages with the moving drum flange 10, the liner will grip the drum flange and be carried with it. If the brake-band be anchored only at its opposite end, substantially all of the band will engage with the brake drum. If the magnet be but lightly energized, this full wrap of the band may not be excessive even for relatively light vehicles. If, however, the current be turned on more strongly, the result is apt to be a too violent seizure of the drum with a consequent locking of the vehicle wheel, or a seizure followed by a slipping and then another seizure, giving rise to a jerking action of the brake. My invention comprises means for so adjusting the anchor of the band as to provide the degree of wrap which is best suited for the particular vehicle to which the brake is to be applied.

To make it possible to regulate the wrap of the brake-band in accordance with the braking action which it is desired to secure, I prefer to provide the flange 14 of the back-plate with a series of apertures, such as are indicated in Fig. 4, where five of such apertures are shown. When an equal braking action in both directions is desired, I secure to the brake-band, midway between its ends, an inwardly extending anchor lug 38, the same being attached to the band in any suitable way, as by rivets 39, Fig. 1. The aperture 40, which is in the flange 14 diametrically opposite the pivot-pin 23, substantially fits the anchor lug so as to permit but slight circumferential movement of the brake-band at said lug. Being located at the mid point of the band longitudinally, this arrangement permits but one half of the band to come into action when either end of the band is expanded into contact with the rotating drum flange. The use of one-half of the band in applying the brake may not be sufficient in all circumstances and on all vehicles. If the vehicle be light or be driven at a relatively slow speed only, it may give a too vigorous application of the brake. In that case it is preferable to employ less than half the length of the brake-band, and I accordingly adopt the arrangement shown in Fig. 6 wherein no anchor lug is employed at the central aperture 40 but a pair of anchor lugs 38a and 38b are spaced equidistantly from the central aperture 40. These lugs are so attached to the brake-band 15 as to project through apertures 40a and 40b respectively of the back-plate flange 14 and to be normally in engagement with that wall of the aperture which is nearest the central aperture 40. With such an arrangement, and assuming the brake-drum to be turning anti-clockwise, only that portion of the brake-band between the anchor lug 38a and the end of the band at the shoe 16 will come into action. Similarly, the opposite end of the band between the lug 38b and the end of the band at the shoe 16a will come into action when the brake drum is turning in a clockwise direction.

In heavy and rapidly-moving vehicles which require vigorous braking action, it is desirable to employ more than half of the brake-band, although the use of the entire band may be objectionable, for reasons above stated. In Fig. 5 I have shown such an arrangement of the anchor lugs 38c and 38d as to employ more than half of the brake-band for braking in either direction of rotation of the brake-drum. In such arrangement, the lugs are normally in engagement or substantial engagement with the walls of the apertures 40a and 40b which are farthest from the central aperture 40, the lug 38 for said central aperture being omitted. With the arrangement of Fig. 5, assuming the wheel to be turning in an anti-clockwise direction, the lug 38d becomes the active anchor lug, and all of the band between said lug and the end at the shoe 16 becomes active when the brake-band is expanded at the said shoe. If the brake-drum be rotating in the clockwise direction, the lug 38c becomes the active anchor lug and all of the band between 38c and the end at the shoe 16a becomes active when the latter shoe is moved to bring the brake liner into engagement with the drum flange 10.

The apertures in the flange 14 may be variously spaced and may be of any desired number so that the person assembling the brake may place the anchor lug in substantially any position desired to obtain that degree of braking action which he considers necessary to employ on the particular vehicle to which he is applying the brakes. Instead of preforming all of said apertures, they may be formed when the brake is to be assembled and thus placed just where needed. When a pair of anchor lugs is used, they may be spaced equi-distantly from the center aperture 40 so as to secure the same braking effect, whether the drum be turning in one direction or the other. It may be considered desirable in some cases to employ a more vigorous brake application when the vehicle is moving in a forward direction than when it is moving rearwardly. In that case, the lug 38d, Fig. 5, and assuming that the forward rotation is anti-clockwise, would be farther from the central aperture 40 than the lug 38c. To provide for placing the lugs in various positions to secure the desired braking effect in both directions of movement of the vehicle, the flange 14 may be provided with closely spaced apertures in any desired and practicable number, as is indicated in Fig. 4. It may be found desirable in some cases to employ more than half the brake-band when the vehicle is moving forwardly and less than half the band when the vehicle is moving rearwardly. In such case, a single lug corresponding to the lug 38 of Fig. 1 may be employed to engage with the end walls of one of the apertures shown at the right of the aperture 40 in Fig. 4.

All of the anchor lugs not only fit loosely within their respective apertures in the element 14, but are slightly tapered, as shown, thereby making it possible for them to move freely in and out in the apertures as the brake-band is expanded or contracted, thus retaining that very desirable feature that no adjustment is required after the brake is once installed, as the band is always free to move outwardly into operative position regardless of how much the liner may be worn or how much the brake-drum may be expanded by heat.

As a summary of the operation of the invention, it may be stated that when it is desired to set the brake the operator merely closes a switch in the electric circuit which includes the electromagnet 30. If the brake drum 11 be then in rotation, the magnet adheres to the armature plate 34 and moves with it in whichever direction said plate is turning, with the result that the magnet is carried about with the plate, pivoting about the pin 23. This movement of the magnet swings the lever 27 or 27a which is in advance of the magnet upon the pivot pin and causes the corresponding cam 26 or 26a to expand the corresponding end of the brake band into contact with the brake flange 10, thus to arrest the rotation of the brake drum. Only that part of the band which is between the end and the anchor 38 will thus be expanded; and, since the anchor can be placed in various positions along the length of the band, the braking action may be made such as is required for the particular vehicle to which the brake is applied. If but one anchor lug 38 be employed, as in Fig. 1, and that lug be midway between the ends of the band, the braking action will be the same irrespective of the direction of rotation. If but a single anchor lug be used and it be placed nearer one end of the band than the other, the greater braking effect will be secured when the longer end of the band is applied, as will be obvious. By using a pair of anchoring lugs, as in Figs. 5 and 6, and by arranging them in appropriate positions on the band, any desired braking effect in both directions of rotation of the brake drum can be secured.

It is believed that the above description of the structure and operation will make clear that I have devised a practical but simple means for so adjusting the brake at the time of installation as to secure the braking action best suited for the particular vehicle to which the brake is to be applied. The flange 14 or the elements 14a, Fig. 7, serve a dual purpose: they comprise means which cooperate with the anchor lugs on the brake-band to hold or anchor the band at the desired point, as has been described. Moreover, they constitute an inner support for the brake-band, or of such parts of it as are not in action, and they prevent any possible inward buckling of the band when the brake is applied, thus insuring that the band will expand outwardly into frictional engagement with the drum flange 10.

As another advantage of my invention, it may be pointed out that, by anchoring the brake-band at a point or at points intermediate its ends, a shorter travel of the cam-ends 26 and 26a of the brake-operating levers is required than is necessary when the band is anchored at its ends only.

It may be stated, further, that I am now using on my automobile brake-bands having the anchor lugs arranged to give a wrap of two-thirds in both forward and reverse on the front wheels, and a half forward and two-thirds reverse on the rear wheels, and that this arrangement gives the smoothest and most satisfactory brake that I have ever used.

Having thus described my invention, I claim:

1. A brake comprising a rotatable member having a brake-engaging surface, a stationary member adjacent the rotatable member, a split brake element coaxial with the rotatable member, cooperating means on the stationary member and the brake element in substantial circumferential alinement with said brake element for anchoring the latter to the stationary member intermediate the ends of the brake element, and means for moving that portion of the brake element which is between the anchor means and one end of said element into braking relation with the rotatable member.

2. A brake comprising a rotatable drum having an annular flange thereon, a stationary member adjacent said flange, a split brake element coaxial with said drum and its flange, cooperating means on the stationary member and the brake element in substantial circumferential alignment with said brake element for anchoring the latter to the stationary member at various points intermediate the ends of the brake element, and means carried by the stationary member and engageable with the brake element adjacent one of its ends for causing that part of the element which is between its said end and the point at which the element is anchored to the stationary member into frictional engagement with the flange on the rotatable drum.

3. A brake comprising a rotatable drum having thereon a laterally-projecting, annular flange, a stationary back-plate coaxial with said drum, said back-plate, drum and flange forming a cylindrical chamber within the flange, means projecting from the back-plate into said chamber in annular arrangement concentric with but spaced from said flange, a split brake-band in the annular space between the said projecting means and the flange, an anchor member secured to the band at a pre-selected point intermediate the ends of the latter to engage with the said projecting means from the back-plate to anchor the band to the said means, and mechanism carried by the back-plate and operable to move either end of the brake-band into frictional engagement with the said flange, whereby, when either end of the band is moved into braking engagement with the flange, that portion of the band between said end and the anchor member becomes operative in effecting the braking action.

4. A brake as set forth in claim 3 in which the means projecting from the back-plate into the chamber is an annular flange having therein a series of spaced apertures into which the anchor member on the brake-band may be projected, thus to anchor the band at any desired point intermediate its ends.

5. A brake as set forth in claim 3 in which the means projecting from the back-plate into the chamber is an annular flange having therein a series of apertures and in which the anchor member for the band is a lug which projects from the band through one of the said apertures.

6. A device for braking a wheel when rotating in either a forward or reverse direction comprising a member rotatable with the wheel, a split brage element adapted for frictional engagement with said rotatable member, a pair of anchor members connected with the brake element intermediate its ends, stationary means for engagement with the respective anchor elements at points in substantial circumferential alinement with said brake element, means for moving one end of the brake element into engagement with the said rotatable member when the latter is rotating in the forward direction thus to cause that part of the brake element which is between the said engaging end of the element and one of the anchor members to become active in braking the rotatable member, and means for moving the opposite end of the brake element into engagement with the said rotatable element when the latter is rotating in the reverse direction thus to cause that part of the brake element which is between the said opposite end of the element and the other one of the anchor members to become active in braking said rotatable member.

7. A device as set forth in claim 6 in which the anchor members connected with the brake element are lugs which project from the element and the stationary means comprises a member having apertures therein into which the said lugs loosely project.

8. A device as set forth in claim 6 in which the two anchor members on the brake element are on opposite sides of the longitudinal center of the said element from the respective ends of the member with which they coact, whereby more than one-half of said brake element is brought into action in braking whether the rotatable member is turning in either the forward or the reverse direction.

9. An electro-magnetic brake comprising a rotatable drum having a flange thereon, a split brake-band within said flange and adapted for frictional engagement therewith, a back-plate mounted coaxially with the drum, a pair of levers pivoted upon said back-plate and adapted to move the respective ends of the brake-band into engagement with the said flange, each of said levers having an arc-shaped portion curved concentrically with the pivot of the levers, the curved portions of said levers lying parallel with each other and extending in opposite directions, an electro-magnet slidably supported upon the curved portions of said levers and so disposed with reference to the brake-drum that the latter forms the armature of the magnet, and means supported by the back-plate for anchoring the brake-band intermediate its ends, the construction and arrangement being such that when the brake-drum is turning and the magnet is energized the magnet is moved by the drum thus to swing one of said levers to bring its respective end of the brake-band into braking relation with the drum flange.

10. An electro-magnetic brake comprising a rotatable drum having a flange thereon, an annular armature-plate mounted upon the drum within the flange thereof, a split brake-band within said flange and adapted for frictional engagement therewith, a back-plate mounted coaxially with the drum and the armature-plate, a pair of levers pivoted upon said back-plate and adapted to move the respective ends of the brake-band into engagement with the said flange, each of said levers having an arc-shaped portion curved concentrically with the pivot of the levers, the curved portions of said levers lying parallel with each other and extending in opposite directions, an electro-magnet slidably supported upon the curved portions of said levers and so disposed with reference to the armature-plate that the latter forms the armature of the magnet, and means supported by the back-plate for anchoring the brake-band intermediate its ends, the construction and arrangement being such that when the brake-drum is turning and the magnet is energized the magnet is moved with the drum thus to swing one of said levers to bring its respective end of the brake-band into braking relation with the drum flange.

11. An electro-magnetic brake comprising a rotatable drum having a flange thereon, a split brake-band within said flange and adapted for frictional engagement therewith, a back-plate mounted coaxially with the drum, a pair of levers pivoted upon said back-plate and adapted to move the respective ends of the brake-band into engagement with the said flange, each of said levers having an arc-shaped portion curved concentrically with the pivot of the levers, the curved portions of said levers lying parallel with each other and extending in opposite directions, an electro-magnet slidably supported upon the curved portions of said levers, an annular armature-plate carried by the drum and so disposed with reference to the electro-magnet as to form the magnet armature, means for lightly pressing the magnet against the said armature-plate, and means supported by the back-plate for anchoring the brake-band intermediate its ends, the construction and arrangement being such that when the brake-drum with its armature-plate is turning and the magnet is energized the magnet is moved by the armature-plate to swing one of said levers so as to bring the respective end of the brake-band into braking relation with the drum flange.

12. An electro-magnetic brake comprising a rotatable drum having a flange thereon, a split brake-band within said flange and adapted for frictional engagement therewith, a back-plate mounted coaxially with the drum, a pair of levers pivoted upon said back-plate and adapted to move the respective ends of the brake-band into engagement with the said flange, each of said levers having an arc-shaped portion curved concentrically with the pivot of the levers, the curved portions of said levers lying parallel with each other and extending in opposite directions, an electro-magnet slidably supported upon the curved portions of said levers, an annular armature-plate carried by the drum and so disposed with reference to the electro-magnet as to form the magnet armature, means for lightly pressing the magnet against the said armature-plate, and cooperating means on the back-plate and the brake-band for anchoring the brake-band at various points intermediate its ends, the construction and arrangement being such that when the brake-drum with its armature-plate is turning and the magnet is energized the magnet is moved by the armature-plate to swing one of said levers so as to bring the respective end of the brake-band into braking relation with the drum flange.

13. An electro-magnetic brake comprising a rotatable drum having a flange thereon, a split brake-band within said flange and adapted for frictional engagement therewith, a back-plate mounted coaxially with the drum, a pair of levers pivoted upon said back-plate and adapted to move the respective ends of the brake-band into engagement with the said flange, each of said levers having an arc-shaped portion curved concentrically with the pivot of the levers, the curved portions of said levers lying parallel with each other and extending in opposite directions, an electro-magnet, a bracket attached to said magnet and embracing the curved and parallel portions of said levers to support the magnet slidably upon said levers, an annular armature-plate upon said drum and coaxial therewith, a curved non-magnetic member secured to the back-plate, a spring interposed between the said curved plate and the electro-magnet for pressing the latter lightly against the armature-plate, and means carried by the back-plate for engaging the brake-band to anchor the same to the back-plate at a point intermediate the ends of the band, the construction and arrangement being such that when the brake-drum is turning and the magnet is energized the magnet is moved with its armature to swing one of said levers to bring the respective end of the brake-band into braking relation with the drum flange.

14. An electro-magnetic brake comprising a rotatable drum having a flange thereon, a split brake-band within said flange and adapted for frictional engagement therewith, a back-plate mounted coaxially with the drum, a pair of levers pivoted upon said back-plate and adapted to move the respective ends of the brake-band into engagement with the said flange, each of said levers having an arc-shaped portion curved concentrically with the pivot of the levers, the curved portions of said levers lying parallel with each other and extending in opposite directions, an electromagnet, a bracket attached to said magnet and embracing the curved and parallel portions of said levers to support the magnet slidably upon said levers, an annular armature-plate upon said drum and coaxial therewith, a curved non-magnetic member secured to the back-plate, a spring interposed between the said curved plate and the electro-magnet for pressing the latter lightly against the armature-plate, and cooperating means on the back-plate and brake-band to anchor the latter to the back-plate at points intermediate the ends of the band, the construction and arrangement being such that when the brake-drum is turning and the magnet is energized the magnet is moved with its armature to swing one of said levers to bring the respective end of the brake-band into braking relation with the drum flange.

15. A brake comprising a rotatable drum having a flange projecting coaxially therefrom, a split brake band within the said flange, a stationary member coaxial with the said flange, an element cooperating with the stationary member and the brake band at points in substantial circumferential alinement with the latter and serving to anchor the band to said member intermediate the ends of the band, and means for expanding either end of the brake band into contact with the said flange.

16. A brake comprising a rotatable drum having thereon a laterally projecting annular flange, an annular stationary member within the said flange and spaced therefrom to provide an annular space between the flange and member, a split brake band within said annular space, means for anchoring the brake band to the stationary member at a pre-selected point intermediate the ends of the band, and means extending between the ends of the brake band for forcing either end of the latter into frictional engagement with the flange on the drum.

17. A structure as set forth in claim 16 in which the annular stationary member is provided with an aperture and the means for anchoring the brake band to said member comprises a lug secured to the band and projected into the said aperture in the said member.

18. A structure as set forth in claim 16 in which the annular stationary member is provided with a series of apertures and the means for anchoring the brake band to said member comprises a pair of lugs secured to the band and projected into pre-selected apertures in the said member.

MORRIS BURR CHAMBERS.